No. 726,938. PATENTED MAY 5, 1903.
R. C. KELLY, R. STROPPEL & P. F. WYJACK.
VENDING APPARATUS.
APPLICATION FILED JUNE 13, 1901.
NO MODEL. 6 SHEETS—SHEET 1.

WITNESSES:

INVENTORS
Richard C. Kelly
Rudolph Stroppel
Paul F. Wyjack
BY
ATTORNEYS

No. 726,938. PATENTED MAY 5, 1903.
R. C. KELLY, R. STROPPEL & P. F. WYJACK.
VENDING APPARATUS.
APPLICATION FILED JUNE 13, 1901.

NO MODEL. 6 SHEETS—SHEET 2.

WITNESSES:

INVENTORS
Richard C. Kelly
Rudolph Stroppel
Paul F. Wyjack
BY
ATTORNEYS

No. 726,938. PATENTED MAY 5, 1903.
R. C. KELLY, R. STROPPEL & P. F. WYJACK.
VENDING APPARATUS.
APPLICATION FILED JUNE 13, 1901.
NO MODEL. 6 SHEETS—SHEET 4.
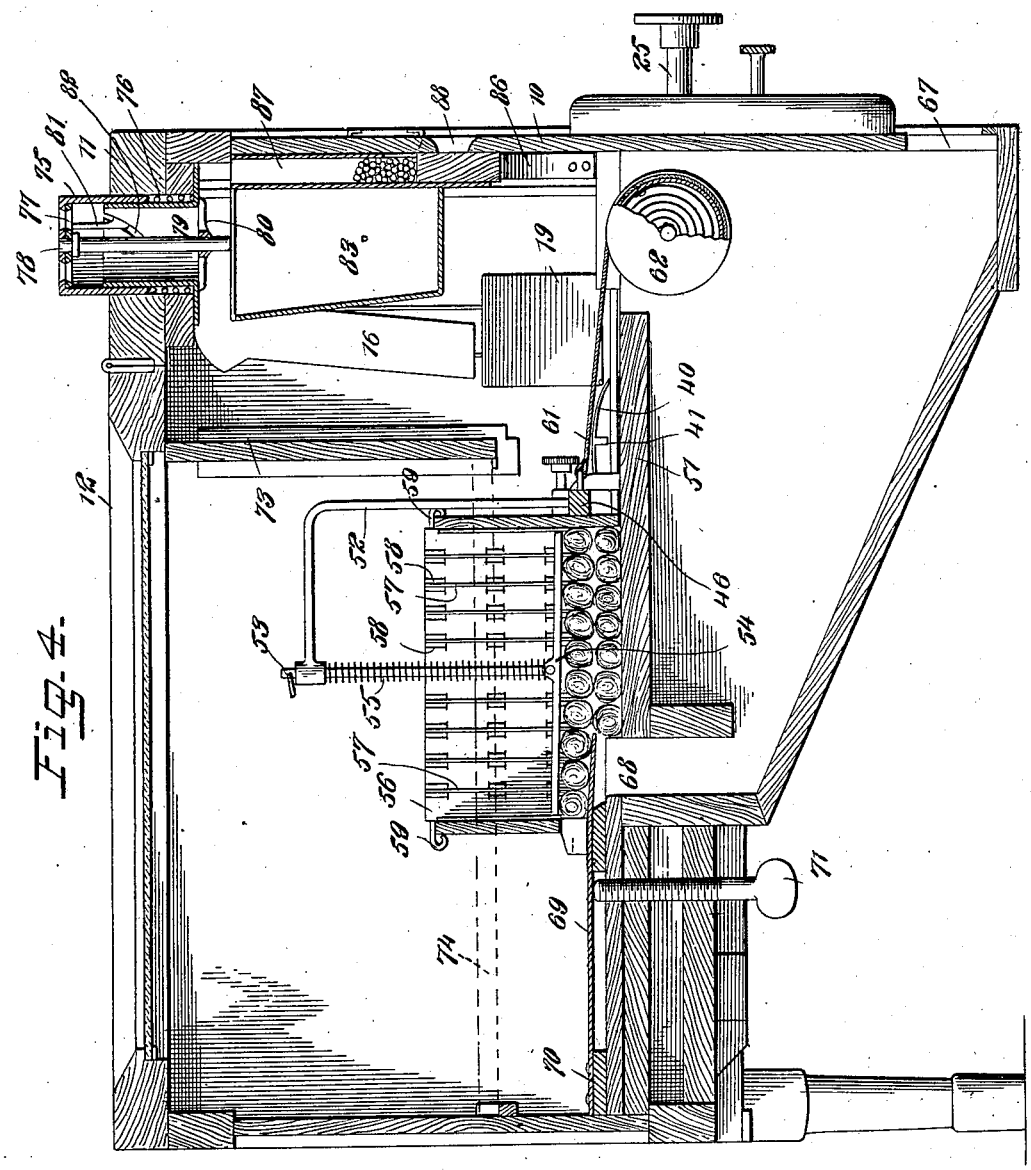
Fig. 4.
WITNESSES:
James T. Duhamel
J. B. Owens.
INVENTORS
Richard C. Kelly
Rudolph Stroppel
Paul F. Wyjack
BY
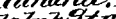
ATTORNEYS No. 726,938. PATENTED MAY 5, 1903.
R. C. KELLY, R. STROPPEL & P. F. WYJACK.
VENDING APPARATUS.
APPLICATION FILED JUNE 13, 1901.
NO MODEL. 6 SHEETS—SHEET 5.
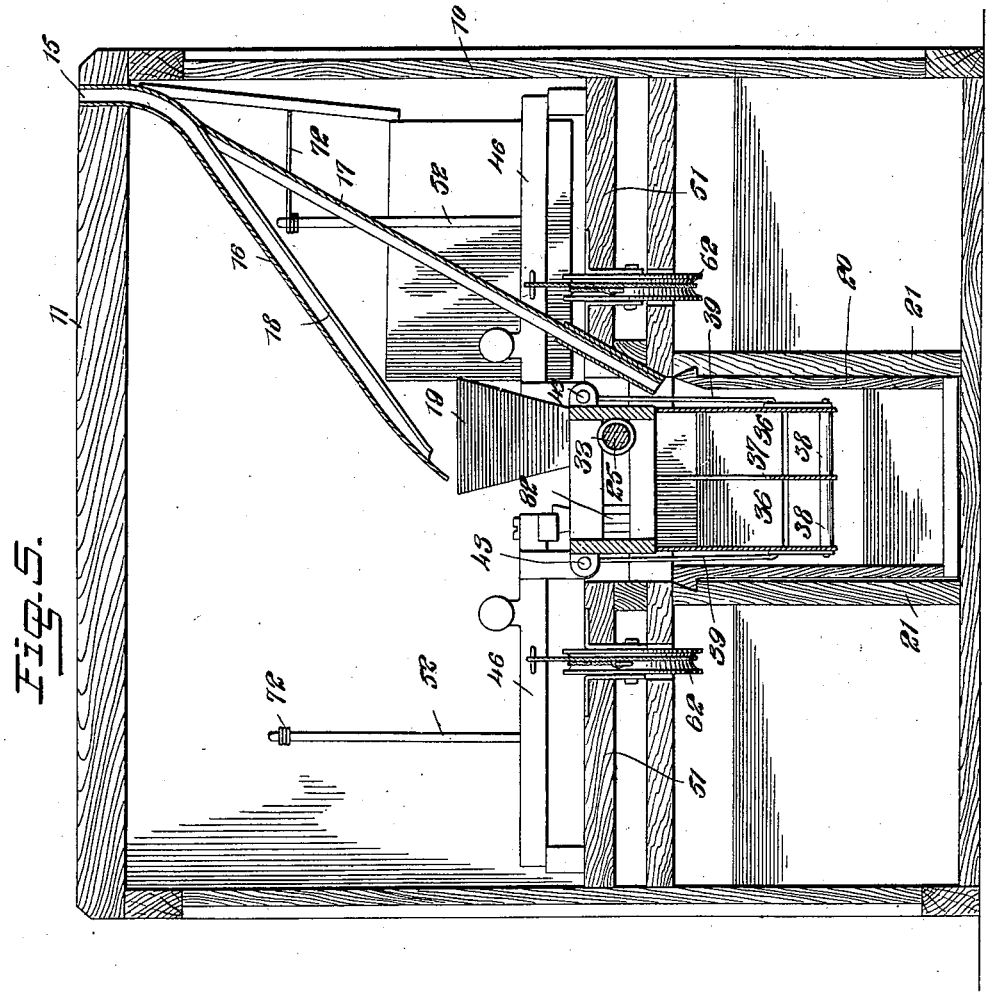

No. 726,938. PATENTED MAY 5, 1903.
R. C. KELLY, R. STROPPEL & P. F. WYJACK.
VENDING APPARATUS.
APPLICATION FILED JUNE 13, 1901.
NO MODEL. 6 SHEETS—SHEET 6.
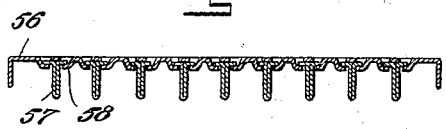
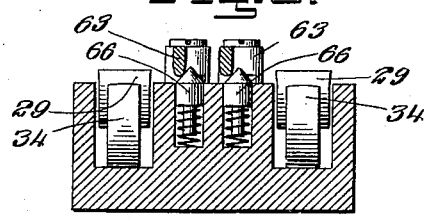
WITNESSES:
INVENTORS
Richard C. Kelly
Rudolph Stroppel
Paul F. Wyjack
BY
ATTORNEYS No. 726,938.  
Patented May 5, 1903.

UNITED STATES PATENT OFFICE.

RICHARD C. KELLY, OF DAVENPORT, RUDOLPH STROPPEL, OF CEDAR VALLEY, AND PAUL F. WYJACK, OF IOWA CITY, IOWA.

VENDING APPARATUS.

SPECIFICATION forming part of Letters Patent No. 726,938, dated May 5, 1903.

Application filed June 13, 1901. Serial No. 64,409. (No model.)

*To all whom it may concern:*

Be it known that we, RICHARD C. KELLY, of Davenport, in the county of Scott, RUDOLPH STROPPEL, of Cedar Valley, in the county of Cedar, and PAUL F. WYJACK, of Iowa City, in the county of Johnson, State of Iowa, all citizens of the United States, have invented a new and Improved Vending Apparatus, of which the following is a full, clear, and exact description.

This invention relates to a machine adapted especially for vending cigars from the boxes in which they are packed, and the vending apparatus is associated with certain peculiar coin-controlled devices, so that upon the insertion of a coin a cigar will be delivered.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1:
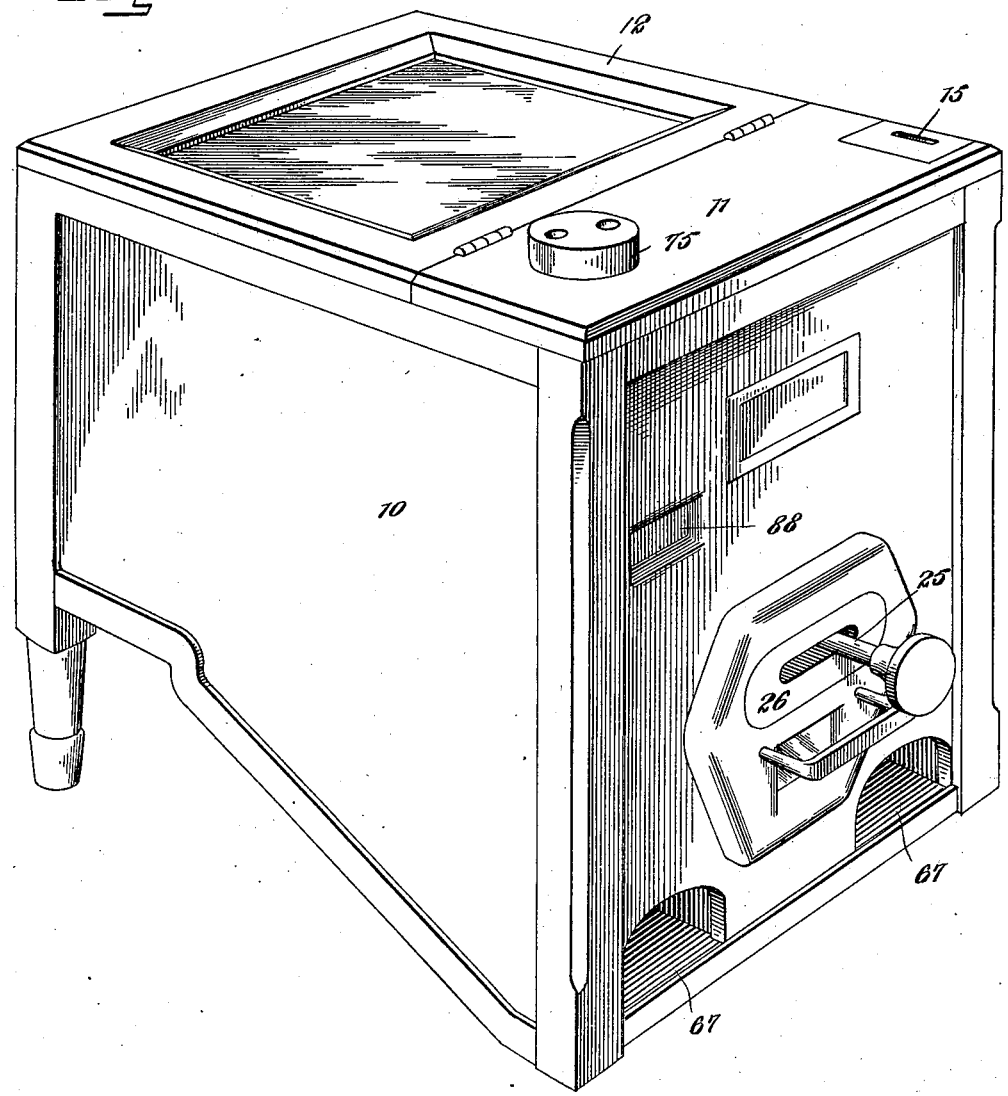
Figure 2:
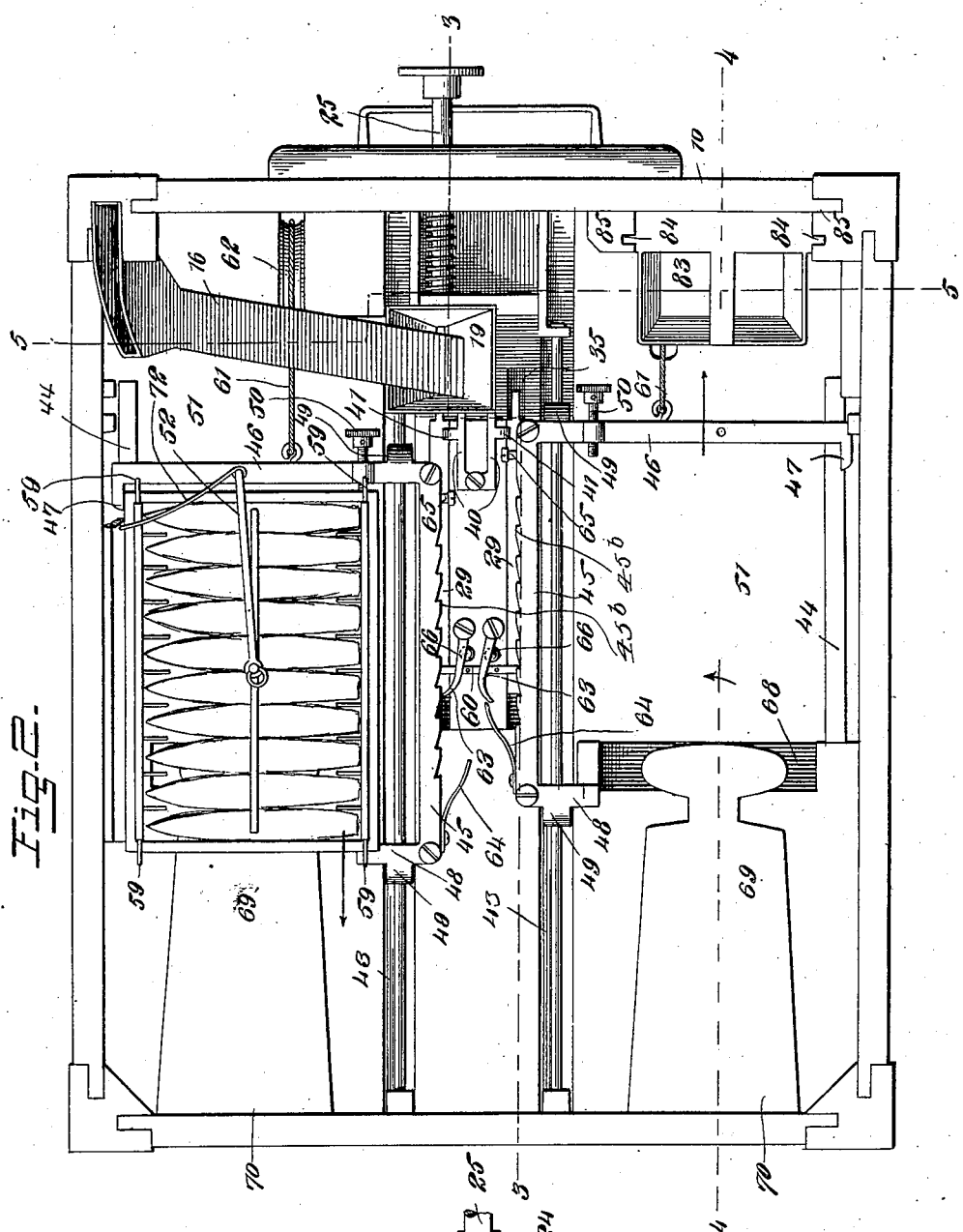
Figure 3:
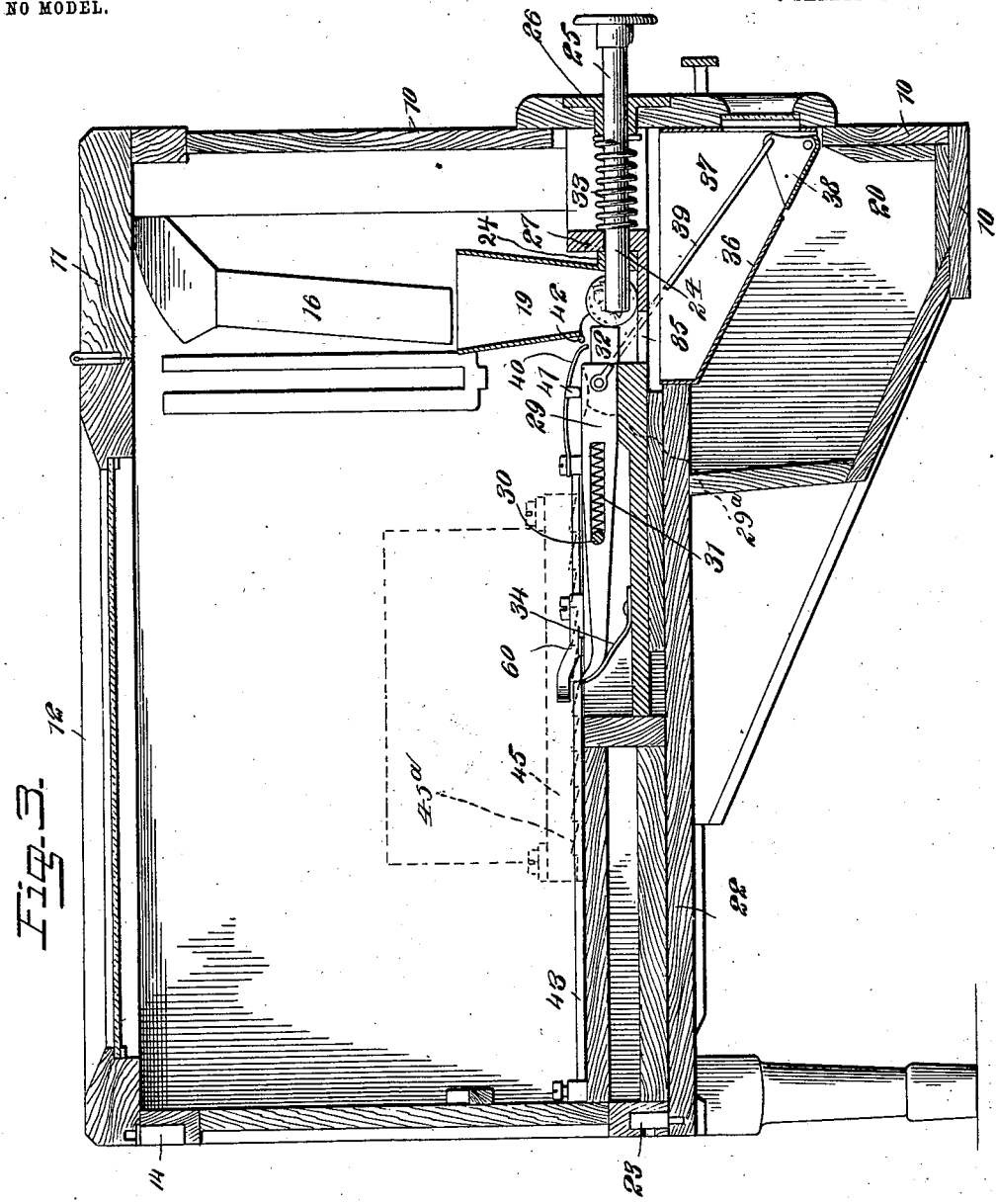

Figure 1 is a perspective view of the invention. Fig. 2 is a plan view with the top of the casing removed. Fig. 3 is a section on the line 3 3 of Fig. 2. Fig. 4 is a section on the line 4 4 of Fig. 2. Fig. 5 is a section on the line 5 5 of Fig. 2. Fig. 6 is a sectional plan view showing the action of the coin. Fig. 7 is a horizontal section of one of the cigar-partitions which are fitted in the cigar-box, and Fig. 8 is a detail section showing the latch-pins for holding the pawls of the box-carriers.

The operative parts of the machine are inclosed in a suitable case 10, which may be constructed of wood or metal, as desired, and be in any form convenient to the operating parts or attractive to the eye. The top of this case comprises a stationary part 11 and a hinged part 12, the latter being provided with a glass panel, enabling the interior of the casing to be seen, so that the customer may see the cigars which he is about to purchase. The hinged part 12 of the casing is closed by a lock 14. The coin is inserted in the casing through a slot 15 in the stationary part 11 of the top. This slot leads to a true-coin chute 16 and a false-coin chute 17. The true-coin chute 16 has inwardly-projected flanges 18 at its lower side edges, such flanges carrying a coin of proper denomination. If a coin of improper denomination is inserted in the slot 15, such improper coin passes the flanges 18 and falls into the chute 17. The true-coin chute 16 delivers into a hopper 19, provided for the reception of the true coins, and the false-coin chute 17 passes by the hopper 19 and delivers into the cash-drawer 20, which is mounted in suitable guideways 21, forming parts of the framing of the casing 10. This cash-drawer is mounted on a slide 22, which is fitted in the bottom of the casing 10 and is removable by rearward movement, such movement carrying with it the cash-drawer. A lock 23 is provided for securing the cash-drawer.

The hopper 19 is carried by means of a collar 24 on the push-bar 25, (see Fig. 3,) the hopper moving with the push-bar laterally and longitudinally thereof. The hopper 19 is of such form that these movements as mentioned above will not interfere with the reception of the coin by the hopper from the chute 16. As shown best in Figs. 1 and 3, the push-bar 25 is mounted to move longitudinally and laterally in a bearing 26, carried by the front wall of the casing 10, and in a bearing 27, formed in the interior framing of the machine. The front end of the push-rod 25 projects below the hopper 19 and is bifurcated, as indicated at 28 in Fig. 6. Mounted in the interior framing of the apparatus and arranged to move longitudinally therein are two pawl-bars 29. These bars are arranged loosely on pins 30, carried in the interior framing of the machine. The pawls 29 are slotted to receive the pins and contain in the slots expansive springs 31, which push the pawl-bars to the rightward in Fig. 3, or, in other words, the front of the machine. Each pawl-bar is provided with a reduced front end 32, these reduced ends being of a thickness equal to the bifurcation in the front end of the push-bar 25. As indicated in Fig. 3, when a coin falls into the hopper 19 it will pass into the lower portion thereof and lie within the bifurcation 28 of the push-rod 25. As this rod is pushed inward against the action of a spring 33, which tends to push the rod forward, the coin is pressed against the reduced end 32 of the pawl-bar 29, which pawl-bar lies in line with the push-rod. In this connection it may be seen by reference to Figs. 1, 2, and 5 that the push-rod 25 may be pushed laterally to lie in line with either one of the pawl-bars 29. When the parts are in the position indicated in Figs. 3 and 6 and the proper coin bears between the elements 32 and 25, by pushing in the rod 25 the pawl-bar will be moved rearward. The rear end of this bar is curved upward, as shown in Fig. 3, and against the under side of this end a spring 34 bears. As the pawl-bar 29 moves rearward its rear end rides over the spring 34, and this causes the rear or working end to move upward and engage with the cigar-box carrier, which will be fully described hereinafter. As the push-rod 25 is moved rearward from the position shown in Fig. 3 the coin is moved over one of the two slots 35, which are formed in the interior framing of the machine just below the plane of the push-rod 25. There are two of these slots 35, said slots being respectively related to the pawl-bars 29 in the relative positions indicated in Figs. 2 and 3. Below the slots 35 a chute 36 is arranged, this chute having a partition 37, dividing it into two compartments, which are related, respectively, to the slots 35. The two compartments of the chutes 36 are each provided with a gate 38, these gates commanding the compartments and being provided with rods 39, connecting the gates, respectively, with the pawl-bars 29. As the pawl-bars 29 move rearward under the action of the push-rod the gates 38 are thrown open, and as the pawl-bars 29 return the gates are closed in the manner shown in Fig. 3.

Mounted on a rigid part of the interior framing of the casing 10 are two spring-fingers 40, which have transverse projections 41 lying, respectively, over the indented surfaces in the pawl-bars 29, such indented surfaces 29$^a$ being indicated by dotted lines in Fig. 3. The front ends of the spring-fingers 40 project forwardly into position to be engaged by a transversely-disposed rod 42, carried by the lower rear portion of the hopper 19. As the hopper moves rearward with the push-rod 25 the bar 42 strikes the front ends of the spring-fingers 40 and throws these fingers downward. Simultaneously one of the pawl-bars 29 is moved rearwardly by the rearward action of the push-rod, and as the spring-fingers 40 move down one of these fingers engages its projection 41 with the front end of the pawl-bar 29, thus temporarily holding the pawl-bar against return. Meanwhile as soon as the manual pressure on the push-rod 25 is relaxed the spring 33 returns the push-rod. Therefore the push-rod moves forward ahead of the pawl-bars, and this allows time for the coin to drop through the appropriate slot 35 and into the chute 36. The purpose of the gates 38 and their connection with the pawl-bars 29 through the medium of the rods 39 is to hold the coins within the chute 36 until the second operation of the machine. By this arrangement a coin is left continually in view of the intending customer, and upon each operation of the machine a new coin falls into the chute 36, and the coin previously therein is dropped into the cash-drawer 20.

According to the construction which we have here illustrated the vending-machine is adapted to carry two boxes of cigars. These cigars may be of different grades, if desired, and by means of the glass panels in the section 12 in the top of the casing 10 the purchaser may view the cigars and select the grade he desires. We provide a carrier for each box. These carriers are mounted on guide-bars 43, which are located adjacent to the longitudinal center of the vending-machine, respectively adjacent to the pawl-bars 29. The box-carriers also run on guide-rails 44, located adjacent to the side walls of the casing 10. Each box-carrier comprises a longitudinal bar 45, having ratchet-teeth 45$^a$ on its under side and ratchet-teeth 45$^b$ on its inner side. From the front end of each longitudinal bar 45 a transverse bar 46 projects. The outer end of each bar 46 has a transversely-disposed stop 47 formed thereon, and the front end of each longitudinally-disposed bar 45 has a transverse stop 48. The stops 48 and the inner ends of the transverse bars 46 are provided with boxes 49, which run on the guide-rods 43, and thereby mount the box-carriers on these rods. Each transverse bar 46 of the box-carriers is provided with a set-screw 50, and these screws are adapted to engage the cigar-boxes, so as to clamp them against the stops 48 in the manner indicated in Figs. 2 and 4. Applying the cigar-boxes to the carriers, the bottoms of the boxes are cut away in any desired manner as may be convenient to the person using the vending-machine. The rear end walls of the boxes are also cut slightly at their lower edges, as shown in Fig. 4, while the front end walls of the boxes are left intact. The boxes thus disposed are placed in the carriers with the lower tier of cigars resting on the interior horizontal floor members 51 of the framing or casing 10 of the machine. Each bar 46 of the cigar-carriers is provided with an upwardly-projecting post 52. (See Fig. 5.) These posts 52 are bent rearwardly at their upper ends and carry vertically-movable rods 53, having followers 54 at their lower ends. These rods 53 are pressed downward by expansive springs 55. (See Fig. 4.) The followers 54 are adapted to bear upon the cigar-boxes and upon the cigars therein, so as to force them downward with a steady pressure. When the cigar-boxes are being prepared for emplacement within the vending-machine, cigar-partitions are fitted against the inner side walls of the boxes, so as to hold the cigars in true vertical piles within the box, thus retaining the relative position of the cigars and facilitating their delivery. These partitions are shown best in Figs. 4 and 7, while Fig. 2 illustrates their position in the boxes. Each partition consists in a body or plate 56, with a number of vertically-disposed flanges 57 fastened thereto by means of tongues 58 on the plates 56. These tongues serve adjustably to hold the partitions and enable their positions to be changed whenever desired, so as to suit the size and arrangement of the cigars. These partition-plates 56 are pushed downward within the boxes, respectively, at the ends of the cigars, so as to lie snugly against the inner side walls of the boxes and to receive the ends of the cigars between the flanges 57. Each plate 56 is provided at its upper edge with a rod 59, which projects beyond the end edges of the plates and which bears on the upper edges of the box.

As before mentioned, the longitudinal bars 45 of the box-carriers are provided with ratchet-teeth $45^a$ and $45^b$ on their bottom and inner sides. The bottom ratchet-teeth $45^a$ are engaged, respectively, by the pawl-bars 29. Normally these pawl-bars are not engaged with the frame-bars 45, but occupy the position shown in Fig. 3. When, however, the pawl-bars are pushed forward, they ride up on the springs 34 and engage with the frame-bars 45, thus pushing the carriers rearward. As soon as the return or forward movement of the bars 29 begins the working ends of the bars drop downward below the carrier-bars 45 and out of engagement therewith. The upward movement of the pawl-bars 29 is limited by a transverse arm 60, fastened to the upper side of a part of the interior framing of the machine (see Figs. 2 and 3) and projected over the pawl-bars. 29. The box-carriers are connected by cords 61 with spring-drums 62, over which the cords are wound and which actuate the carriers to return them to the front of the machine. The pawl-bars 29 push the carriers rearward against the action of the spring-drums 62. For holding the box-carriers at the desired positions during the rearward movement of the carriers we provide dogs 63. These dogs are pivotally mounted on a part of the interior framing of the machine just between the longitudinal bars 45 of the box-carriers, and the dogs are respectively adapted to bear against the ratchet-teeth $45^b$, formed in the inner side edges of the bars 45. The dogs 63 are thrown into active position by arms 64, fastened, respectively, to the rear ends of the bars 45, and the dogs 63 are thrown into inactive position by pins 65, fastened to the front ends of the bars 45. The dogs 63 are held in either active or inactive positions by latches 66. (Best shown in Fig. 8.) These latches are spring-pressed upward and are mounted in the interior framing of the machine just below the dogs 63. The latches have conical upper ends, and these ends acting on the dogs, as indicated in Fig. 8, hold the latches either in active or inactive position and permit them to be thrown from one position to the other by the operation of a superior force. As the cigar-box carriers reach the end of their rearward movement the pins 65 strike the dogs 63 and throw them inward, thus disengaging them from the carrier-bars 45. The springs in the drums 62 now assert themselves, and the box-carriers are thrown backward to the limit of their forward movement. When this limit is reached, the arms 64 strike the curved ends of the dogs 63 and throw the dogs outward, thus reëngaging them with the carrier-bars 45. When the box-carriers execute this return or forward movement, the pawl-bars 29 are inactive—that is to say, they are lying in their forward position, (see Fig. 3,)—and in this case the pawl-bars 29 do not engage the box-carriers, and therefore do not retard the return movement thereof.

The machine is provided with two delivery-chutes, which are one for each box-carrier and which are shown best in Figs. 1, 2, and 4. These chutes open at the front wall of the casing 10, as indicated at the points 67, and they extend upward from these points through the bottom of the casing 10 and communicate with the upper surface of the floor 51 at the points 68, the points 68 constituting the receiving ends of the delivery-chutes. Over these receiving ends 68 of the delivery-chutes project separating-plates 69, which are fastened securely at their rear ends, as indicated at the points 70 in Figs. 2 and 4. The front ends of the plates are adjustable vertically by means of screws 71, which are mounted in the bottom of the casing 10 and have their heads located below the same, so that they may be readily reached. The cigar-boxes being fitted in the carriers and having their bottoms and the lower portions of their rear end walls cut away, as before explained, as the cigar-boxes are moved rearward by the carriers the boxes pass over the separating-plates, such plates being received in the recesses formed in the lower ends of the rear end walls of the boxes. The separating-plates pass between the lowermost tier of cigars and the tier next thereto, thus supporting the upper tiers and allowing the lower tier of cigars to be dropped through the receiving ends or mouths 68 of the delivery-chutes. Therefore when one of the box-carriers has moved its entire length it will have delivered one tier of cigars. When the box returns to its forward position, the cigars in the box will drop, thus placing the next tier of cigars on the floor 51, and then as the box again moves rearward the above-described operation is repeated. When a coin is inserted in the machine, it permits one reciprocation to be imparted to either one of the pawl-bars 29, and each reciprocation of one of these bars advances the cigar-box carrier and the cigar-box for a distance equal to the width of one cigar. Therefore for each coin inserted it is possible for the purchaser to push the rod 25, and thus eject one cigar from the machine.

In using the apparatus the boxes of cigars have their bottom portions loosened, so that they may subsequently be removed. This removal may take place either after the boxes have been placed in the carriers or before. It will probably be more convenient to first loosen the bottoms and then place the box in the carrier, so that as the movement of the box begins it will leave the bottom on the floor 51. This, however, is not essential to our invention. It is sufficient that the bottoms be removed and that the boxes be properly placed in the carriers. This is done by tightening up the screws 50 of the carrier. The lower edges of the front ends of the boxes are cut away, so as to receive the separating-plates 69. The carriers then occupy their foremost positions. The parts are now in position for operation. When a person inserts a proper coin in the slot 15, this coin passes into the chute 16 and enters the hopper 19. The customer will now inspect the cigars in the two boxes and determine which of the cigars he desires to secure. This having been done, by moving the push-rod 25 laterally to place it opposite either one of the pawl-bars 29 the customer may secure a cigar from the box which lies adjacent to that pawl-bar. When the push-rod has been moved laterally, as explained, it should be pushed inward, thus reciprocating the appropriate pawl-bar 29 and advancing the box-carrier. This advance or rearmost movement of the box-carrier results in the delivery of one cigar, as explained. These operations go on until the pins 65 of the box-carriers strike the dogs 63, throwing them out of engagement with the box-carrier and permitting the springs in the drums 62 to return the carriers to their forward position. The cigars then fall within the box and the above-described operations are repeated. If desired, an arm 72 may be attached to each of the posts 52, these arms being arranged to engage and hold raised the covers of the cigar-boxes, as indicated in Figs. 2 and 5. Only one cigar-box is shown in position in Figs. 2 and 5. A carrier for the other box is shown; but for the sake of clearness the second box is omitted. In Fig. 4, which is a section on the line 4 4 of Fig. 2, we have assumed that a cigar-box with the appurtenant parts is in the line 4 4, although this is not actually the case in Fig. 2. In Fig. 3 we have indicated a cigar-box and its carrier by dotted lines.

The working parts of the apparatus are hidden by cover-boards 73 and 74, which boards are shown in Fig. 4. The board 73 is shown in full lines and the board 74 is indicated by dotted lines. The board 73 extends vertically and transversely across the front portion of the machine, so as to hide the chutes 16 and 17, the hopper 19, and the adjacent parts. The board 74 extends horizontally down the center of the machine between the two cigar-boxes and over the bars 45, so as to cover these parts and the parts 40, 66, 63, and 64. This arrangement of cover-boards enables the cigars to be seen by the customer, but prevents the customer from examining the mechanism of the machine, thus avoiding the possibility of the customer learning how to cheat the mechanism.

If desired, the apparatus may be fitted with a cigar-clipper and a match-receptacle. This cigar-clipper comprises a cylindrical cap 75, mounted in the stationary part 11 of the top of the casing 10 and movable vertically therein, a spring 76 pressing the cap upward. This cap carries in its upper portion a circular knife 77, which is fastened to a centrally-disposed shaft 78. Fitted within the cap 75 is a rigid tube 79, which carries a spider-bearing 80 at its bottom, such bearing receiving the lower end of the shaft 78. An arm 81 is fastened on the blade 77 and plays in a spiral slot 82 in the tube 79. The top of the cap 75 is orificed to permit the introduction of a cigar, and when this is done and the cap pushed downward the action of the walls of the slot 82 on the arm 81 causes the knife 77 to turn relatively to the cap 75, and thus the end of the cigar is cut off. The ends of the cigars fall into a receptacle 83, arranged within the casing 10 below the clipper and provided with ribs 84, which run in suitable guideways 85, carried stationarily within the casing 10. A spring 86 presses upward the receptacle 83. As the cap 75 is pushed downward the shaft 78 moves therewith, and this shaft engages the receptacle 83 and moves it downward. The receptacle 83 carries also a match-receptacle 87, which when the receptacle 83 is raised, as in Fig. 4, is closed, but which when the receptacle is moved downward comes opposite an opening 88 in the casing 10, and one or more matches may be withdrawn through this opening.

Various changes in the form, proportions, and minor details of our invention may be resorted to without departing from the spirit and scope of the invention. Hence we consider ourselves entitled to all such variations as may lie within the scope of our claims.

Having thus described our invention, we claim as new and desire to secure by Letters Patent—

1. A vending-machine having a carrier for the merchandise, a pawl engaging the carrier to advance it, means tending to return the carrier, a rack on the carrier, a dog engaging the rack to prevent return movement of the carrier, and devices on the carrier for alternately throwing the dog into active and inactive position.

2. In a vending-machine, the combination of a carrier, means for operating the same, a rack on the carrier, a dog engaging the rack, a latch serving to hold the dog in active or inactive position, and devices respectively at the ends of the carrier for throwing the dog into and out of engagement with the latch.

3. The combination of a carrier, means tending to draw the carrier in one direction, a rack on the carrier, a pawl coacting with the rack to hold the carrier against the action of said means, devices respectively at the ends of the carrier for throwing the pawl into and out of operation, and means for steadily advancing the carrier against the action of said means tending to draw it.

4. The combination of a carrier, means tending to draw the carrier in one direction, a rack on the carrier, a pawl coacting with the rack to hold the carrier against the action of said means, devices respectively at the ends of the carrier for drawing the pawl into and out of operation, means for steadily advancing the carrier against the action of said means tending to draw it, and a separator-plate over which the carrier moves to deliver the merchandise.

5. The combination of a carrier, means tending to draw the carrier in one direction, a rack on the carrier, a pawl coacting with the rack to hold the carrier against the action of said means, devices respectively at the ends of the carrier for throwing the pawl into and out of operation, a spring-pressed latch holding the pawl releasably in either position, and means for steadily advancing the carrier against the action of said means tending to draw it.

6. The combination of a carrier, means tending to draw the carrier in one direction, a rack on the carrier, a pawl coacting with the rack to hold the carrier against the action of said means, devices respectively at the ends of the carrier for throwing the pawl into and out of operation, a spring-pressed latch holding the pawl releasably in either position, means for steadily advancing the carrier against the action of said means tending to draw it, and a separator-plate over which the carrier moves to deliver the merchandise.

7. A vending-machine, having a plurality of delivery mechanisms arranged side by side, a push-rod, and a slide-like bearing mounting the push-rod to reciprocate longitudinally and also to slide laterally into position opposite either one of the said delivery mechanisms, for the purpose specified.

8. A vending-machine, having merchandise-carriers, a means coacting with each carrier to advance it, a push-rod, said push-rod being movable transversely into position opposite either one of said carrier-advancing means, whereby to operate said means from the push-rod, means tending to return each carrier, a rack on each carrier, a dog engaging each rack to prevent the return of the carrier, and devices on the carrier for alternately throwing the dog into active and inactive position.

9. In a vending-machine, the combination with the delivery devices, of a reciprocal pawl for driving the same, said pawl having a laterally curved or beveled working end and being capable of slight lateral movement, a rack on the delivery devices with which the pawl coacts, means for operating the pawl, and a spring-tongue located adjacent to the working end of the pawl and adapted to be engaged thereby as the pawl operates, whereby to throw the pawl laterally into active position.

10. In a vending-machine, the combination with the delivery devices, of a reciprocal pawl for driving the same, said pawl having a laterally curved or beveled working end and being capable of slight lateral movement, a rack on the delivery devices with which the pawl coacts, means for operating the pawl, a spring-tongue located adjacent to the working end of the pawl and adapted to be engaged thereby as the pawl laterally operates, whereby to throw the pawl into active position, said pawl having a longitudinally-disposed slot therein, and a stationary pin extended loosely through said slot, whereby to mount the pawl to rock and to reciprocate.

11. A vending-machine, having a casing, the bottom of which is formed with a delivery-opening, a separating-plate having its free end projecting over said opening and raised above the bottom of said casing, a merchandise-carrier having an open bottom, said carrier being movable over the delivery-opening in the bottom of said casing and over the separating-plate, whereby the separator-plate separates the lower tier of merchandise in the carrier and allows the same to pass out through the delivery-opening, and means for imparting movement to the merchandise-carrier.

12. In a vending-machine, the combination with the delivery devices, of a holder for the merchandise-box, said holder comprising a frame or carrier formed of a longitudinal bar and a transverse bar joined together at one end and each having at the other end a lateral stop, means for clamping the box in said frame or carrier, a post mounted on the said frame or carrier, a follower sustained by the post, and a spring for pressing said follower into position.

13. A vending-machine having a casing, the bottom of which is formed with a delivery-opening, a separating-plate having its free end projecting over said opening and raised above the bottom of said casing, a merchandise-carrier slidable over the bottom of said casing and over the separating-plate, means for imparting a step-by-step movement to the merchandise-carrier, and means for vertically adjusting said free end of the separator-plate with respect to the bottom of the casing.

14. In a vending-machine, the combination with the delivery devices, of a holder for the box containing the merchandise, said holder comprising a frame or carrier formed of a longitudinal and a transverse bar joined rigidly together at one end, a stop at the outer end of each of said bars, and a clamping device working in one of the bars to engage the box.

In testimony whereof we have signed our names to this specification in the presence of two subscribing witnesses.

RICHARD C. KELLY.
RUDOLPH STROPPEL.
PAUL F. WYJACK.

Witnesses:
BRIGID L. RAMSEY,
CORNELIUS H. MURPHY.